US009561515B2

(12) United States Patent
Richter, Jr. et al.

(10) Patent No.: US 9,561,515 B2
(45) Date of Patent: Feb. 7, 2017

(54) COLD GAS SPRAYING GUN WITH POWDER INJECTOR

(71) Applicant: IMPACT INNOVATIONS GMBH, Rattenkirchen (DE)

(72) Inventors: Peter Richter, Jr., Heldenstein (DE); Leonhard Holzgassner, Reichertsheim (DE); Andreas Gropp, St. Wolfgang (DE); Peter Richter, Sr., Heldenstein (DE)

(73) Assignee: IMPACT INNOVATIONS GMBH, Rattenkirchen (DE)

( * ) Notice: Subject to any disclaimer, the term of this patent is extended or adjusted under 35 U.S.C. 154(b) by 0 days.

(21) Appl. No.: 14/414,248

(22) PCT Filed: Jul. 11, 2013

(86) PCT No.: PCT/EP2013/002062
§ 371 (c)(1),
(2) Date: Jan. 12, 2015

(87) PCT Pub. No.: WO2014/009018
PCT Pub. Date: Jan. 16, 2014

(65) Prior Publication Data
US 2015/0165457 A1     Jun. 18, 2015

(30) Foreign Application Priority Data

Jul. 12, 2012 (DE) .......................... 10 2012 013 815

(51) Int. Cl.
*F23D 11/00* (2006.01)
*B05B 7/16* (2006.01)
(Continued)

(52) U.S. Cl.
CPC ............ *B05B 7/1626* (2013.01); *B05B 7/1486* (2013.01); *C23C 24/04* (2013.01); *H05B 3/42* (2013.01);
(Continued)

(58) Field of Classification Search
CPC ........... F23D 11/04; B64D 1/18; A01G 25/09; A01G 25/16
(Continued)

(56) References Cited

U.S. PATENT DOCUMENTS 5,985,373 A * 11/1999 Chernyshov ............ C23C 4/122
118/311
8,197,895 B2 * 6/2012 Arndt ...................... C23C 24/04
118/311
(Continued)

FOREIGN PATENT DOCUMENTS

DE     33 19 448     11/1984
DE     196 25 135     1/1998
(Continued)

OTHER PUBLICATIONS

International Preliminary Report on Patentability issued in International Application No. PCT/EP2013/002062 dated Jan. 22, 2015.
(Continued)

*Primary Examiner* — Arthur O Hall
*Assistant Examiner* — Christopher R Dandridge
(74) *Attorney, Agent, or Firm* — Nixon & Vanderhye, P.C.

(57) ABSTRACT

The present invention discloses a cold gas spraying gun with a powder injector for injecting a gas/powder mixture into a mixing chamber through which a process gas flows. One powder injector pipe of the powder injector is closed at one face end. A delivery opening for delivering the gas/powder mixture from the powder injector is designed as an opening
(Continued)

in a side wall of the powder injector pipe. The delivery opening opens into the hollow chamber in the powder injector pipe at an axial distance from the closed face end of the powder injector pipe, and therefore a backed-up volume is located between the delivery opening and the closed end face of the powder injector pipe.

4 Claims, 2 Drawing Sheets

(51) Int. Cl.
| | | |
|---|---|---|
| *B05B 7/14* | (2006.01) | |
| *A01G 25/09* | (2006.01) | |
| *A01G 25/16* | (2006.01) | |
| *C23C 24/04* | (2006.01) | |
| *H05B 3/42* | (2006.01) | |
| *F23D 11/04* | (2006.01) | |
| *B64D 1/18* | (2006.01) | |
| *F02M 53/06* | (2006.01) | |

(52) U.S. Cl.
CPC ............... *A01G 25/09* (2013.01); *A01G 25/16* (2013.01); *B64D 1/18* (2013.01); *F02M 53/06* (2013.01); *F23D 11/04* (2013.01); *H05B 2203/022* (2013.01)

(58) Field of Classification Search
USPC .................. 239/135, 71, 344, 361, 128, 79, 434.5,239/591, 594, 13, 85, 139, 398, 416.5, 427, 433,239/434, 589, 67–69
See application file for complete search history.

(56) References Cited

U.S. PATENT DOCUMENTS

| | | | |
|---|---|---|---|
| 9,168,546 B2* | 10/2015 | Xue | ....................... B05B 7/1486 |
| 2007/0160769 A1* | 7/2007 | Maev | .................... B05B 7/1422 |
| | | | 427/446 |
| 2007/0221746 A1* | 9/2007 | Heinrich | ................. C23C 24/04 |
| | | | 239/135 |

FOREIGN PATENT DOCUMENTS

| | | |
|---|---|---|
| DE | 100 37 276 | 2/2002 |
| DE | 10 2007 001 477 | 1/2008 |
| JP | 2001-310142 | 11/2001 |
| WO | WO 2007/110134 | 10/2007 |

OTHER PUBLICATIONS

International Search Report for PCT/EP2013/002062 mailed Oct. 17, 2013.

* cited by examiner

COLD GAS SPRAYING GUN WITH POWDER INJECTOR

This application is the U.S. national phase of International Application No. PCT/EP2013/002062 filed 11 Jul. 2013, which designated the U.S. and claims priority to DE 10 2012 013 815.6, filed 12 Jul. 2012, the entire contents of each of which are hereby incorporated by reference.

The present invention relates to a cold-gas spray gun comprising a powder injector according to the preamble of claim 1.

Cold-gas spraying is a coating method in which the coating material is in powder form and is applied to a support material, a substrate or a component at very high speeds. The powder particles of the pulverulent coating material typically have particle diameters of from 1 µm to 250 µm. The powder particles are accelerated in a gas flow to speeds of from 200 m/s to 1600 m/s in that the particles are injected into a mixing chamber arranged between a nozzle and a high-pressure gas heater, the process gas flowing at high speed out of the high-pressure heater into the mixing chamber such that the powder particles injected into the mixing chamber are accelerated and heated by the gas flow. When the powder particles strike the substrate, the temperature of the powder particles increases to such an extent as a result of plastic deformation of said particles that the powder particles adhere, by means of welding, to the substrate at the boundary surface of the substrate.

WO 2007/110134 A1 discloses a cold-gas spray gun, in which the powder particles are injected, by means of a particle tube, into a mixing chamber arranged between a pressure vessel and a nozzle. In this case, the particle tube comprises a feed opening for feeding a gas-powder mixture into the particle tube and a discharge opening for discharging the gas-powder mixture from the powder injector into the mixing chamber. The end of the particle tube projecting into the mixing chamber has an L-shaped bend, and the discharge opening is an end-face opening in the particle tube, from which opening the powder particles are discharged.

A drawback of this solution is that the powder particles exiting the discharge opening are scattered to a high degree, and therefore the particle tube is subject to high levels of abrasive wear. In addition, the position of the particle tube and thus the direction in which the powder particles flow out of the particle tube cannot be adjusted, and therefore high levels of abrasion occur in both the discharge opening of the particle tube and the nozzle inlet region.

The problem addressed by the present invention is that of providing a cold-gas spray gun having an improved powder injector which is subject to reduced levels of abrasive wear and which produces reduced abrasion of the nozzle inlet region as a result.

This problem is solved by a cold-gas spray gun having the features of claim 1. Advantageous embodiments are described in the dependent claims.

In the cold-gas spray gun according to the invention, the powder injector tube is closed at one end-face end, and the discharge opening is formed as an opening in a side wall of the powder injector tube. The discharge opening opens into the cavity of the powder injector tube at an axial distance from the closed end-face end of the powder injector tube, and therefore a backed-up volume is formed between the discharge opening and the closed end-face end of the powder injector tube.

Owing to the backed-up volume between the closed end-face end of the powder injector tube and the discharge opening, the gas-powder mixture exits the powder injector tube in a perpendicular manner with greatly reduced levels of scattering, and therefore the discharge opening of the powder injector tube is subject to reduced levels of abrasive wear. Since the powder particles are scattered to a very small extent owing to the provision of the backed-up volume, fewer powder particles hit the inner wall in the nozzle inlet region, and therefore the nozzle inlet region is also subject to reduced levels of abrasive wear.

The axial distance between the end-face end of the powder injector tube and the discharge opening, in other words the axial length of the backed-up volume, is preferably between 1 mm and 20 mm, more preferably between 2 mm and 15 mm, and more preferably between 4 mm and 12 mm. The diameter of the powder injector tube in the region of the backed-up volume is preferably between 1 mm and 20 mm, more preferably between 4 mm and 15 mm, and more preferably between 6 mm and 12 mm.

Preferably, a discharge opening axis of the discharge opening encloses an angle of between 60° and 120°, in particular of 90°, with a longitudinal axis of the powder injector tube.

As a result, the direction in which the gas-powder mixture flows out of the powder injector tube can be manipulated.

Preferably, the powder injector tube further comprises a fixing element which is arranged on the outside thereof, has a circular cross section and with which and/or by means of which the powder injector can be fixed to the cold-gas spray gun. The powder injector further comprises a guide and/or stop portion opposite the feed opening. In this case, a longitudinal axis of the fixing element is oriented eccentrically to a longitudinal axis of the guide and/or stop portion.

The fixing element can, for example, be received in a first radial recess which is open towards the outside and has a circular cross section. The guide and/or stop portion can be inserted in a second radial recess in the mixing chamber, which recess is open towards the inside of the mixing chamber. The longitudinal axes of the first and second radial recesses of the mixing chamber are also oriented eccentrically to one another, so that the powder injector can be inserted into the mixing chamber in only one angular position, such that, at the same time, the fixing element is received in the first radial recess and the guide and/or stop portion is received in the second radial recess of the mixing chamber.

A correspondingly formed powder injector can thus be positioned with a high degree of precision in the cold-gas spray gun or in the mixing chamber of the cold-gas spray gun. By precisely positioning the discharge opening along the longitudinal axis of the mixing chamber and thus into the centre of the heating gas flow, the discharge opening is subject to further reduced levels of wear. The gas-powder mixture is also delivered very precisely into the opening in the nozzle arranged downstream of the mixing chamber, such that the inlet region of the nozzle is also subject to reduced levels of wear.

Further advantages, details and features of the invention can be found below in the described embodiment. In the drawings:

FIG. 2a is a spatial view of the powder injector according to the invention; and FIG. 2b is a cross-sectional view of the powder injector shown in FIG. 2a.

In the following description, like reference numerals denote like components or features, and therefore a description of a component set out in reference to one drawing also applies to the other drawings and repetition of the description can thus be avoided.

Figure 1:
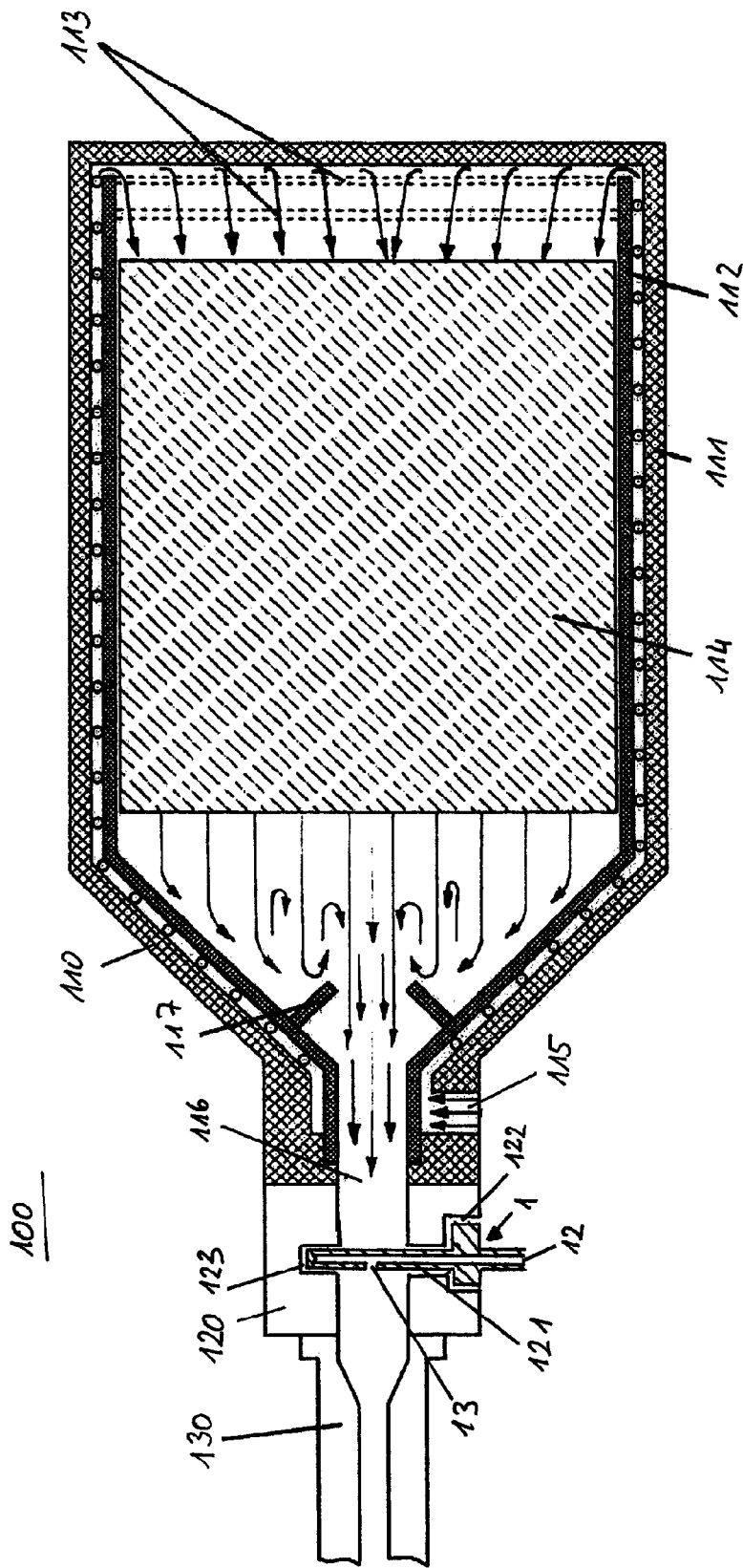
FIG. 1 is a cross-sectional view of a cold-gas spray gun comprising a mixing chamber, into which a powder injector according to the invention is inserted.

FIG. 1 is a cross-sectional view of a cold-gas spray gun 100 comprising a high-pressure gas heater 110, a mixing chamber 120 connected to the high-pressure gas heater 110 and arranged downstream thereof in the gas flow direction, and a nozzle 130 connected to the mixing chamber 120 and arranged downstream thereof in the gas flow direction. The mixing chamber 120 has an opening 121, via which a powder injector 1 for injecting a gas-powder mixture can be inserted into the mixing chamber 120. The mixing chamber also has a first radial recess 122 and a second radial recess 123, the function of which recesses will be mentioned later with reference to FIGS. 2a and 2b.

A process gas is fed to the high-pressure gas heater 110 by means of a gas intake 115. The gas intake 115 is in fluid communication with a gap between a heating jacket 112 and a pressure vessel 111. The process gas flowing through this gap is preheated by the heating jacket and exits the gap at a gap end and hits a pressure vessel cover, which is arranged opposite a gas outlet 116 of the high-pressure gas heater 110. The pressure vessel cover causes the gas flow to be baffled towards the gas outlet 116. The preheated process gas flows through two gas baffle plates 113 which further channel the gas flow. The preheated gas then flows through a heating device 114, which can, for example, be formed as heating tubes arranged in parallel. After flowing through the heating device 114, the process gas flows through a backing-up cone 117 which causes eddying of the process gas and thus a homogenisation of the temperature of the process gas. The process gas then exits the high-pressure gas heater 110 through the gas outlet 116 and flows into the mixing chamber 120.

The powder injector 1 is inserted into the mixing chamber 120 and connected thereto, so that a gas-powder mixture exiting the powder injector 1 is accelerated by the gas flow in the mixing chamber 120. The gas-powder mixture then flows through a nozzle 130, which can, for example, be configured as a Laval nozzle 130, the gas-powder mixture thereby being accelerated further.

The structure of the powder injector 1 according to the invention will be described below with reference to FIGS. 2a and 2b. The powder injector 1 comprises a powder injector tube 10 having a longitudinal axis 10'. The powder injector tube 10 has a feed opening 12 for feeding the gas-powder mixture into the powder injector 1 and a discharge opening 13 for discharging the gas-powder mixture from the powder injector 1. The powder injector tube 10 is closed at one end-face end 14 (shown at the top in FIGS. 2a and 2b). In the powder injector 1 shown in FIGS. 2a and 2b, the powder injector tube 10 is produced by means of a blind hole in the powder injector 1. Alternatively, the powder injector tube 10 can also be closed at the end-face end 14 by means of a plug or any given wall. The discharge opening 13 is an opening in a side wall 11 of the powder injector tube 10. It can be seen from FIG. 2b that the discharge opening 13 opens into the cavity of the powder injector tube 10. In this case, the discharge opening 13 opens at an axial distance from the closed end-face end 14 of the powder injector tube 10, so that a backed-up volume 15 is formed between the discharge opening 13 and the closed end-face end 14 of the powder injector tube 10.

By providing the backed-up volume 15, the gas-powder mixture in the powder injector tube 10 exits the powder injector tube 10 at an angle of 90° to the longitudinal axis 10' of the powder injector tube. Providing the backed-up volume 15 also reduces the degree of scattering of the gas-powder mixture exiting the discharge opening 13.

Figures 2A, 2B:
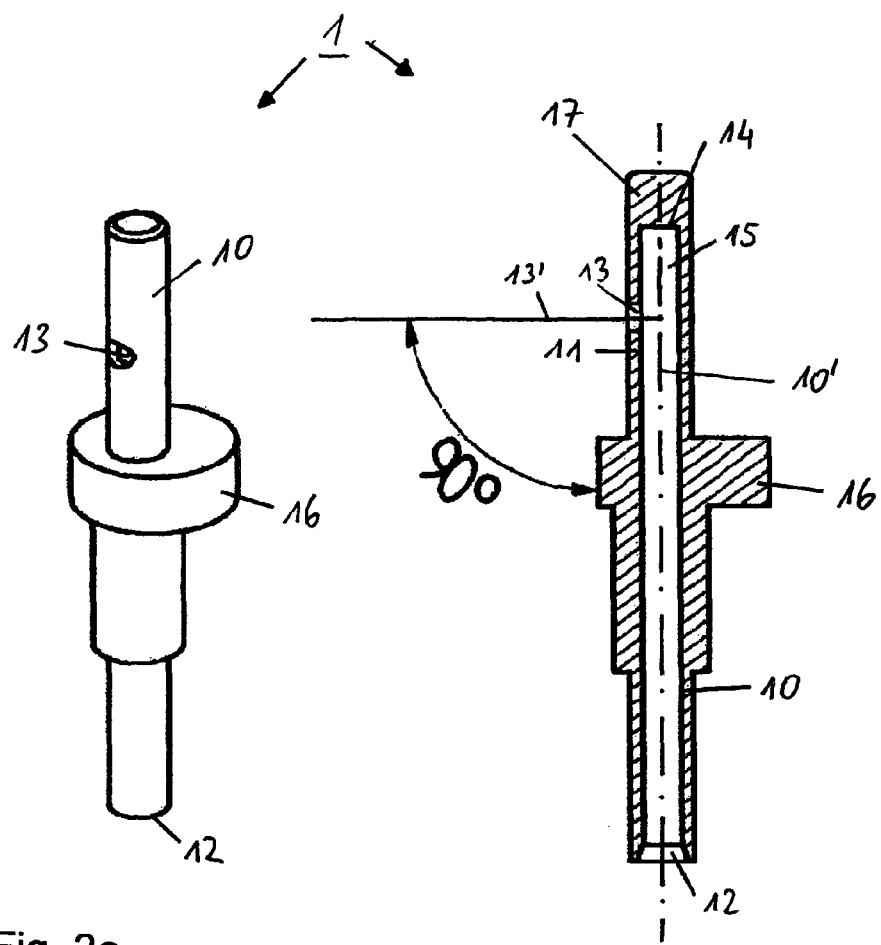

It can be seen from FIGS. 2a and 2b that the powder injector 1 further has a fixing element 16 in the form of a fixing disc 16. The fixing element 16 has a circular cross section. In addition, the longitudinal axis of the fixing element 16 is oriented eccentrically to the longitudinal axis 10' of the powder injector tube 10. In the embodiment shown in FIGS. 2a and 2b, the fixing element 16 is formed integrally on the powder injector tube 10.

The powder injector 1 further comprises a guide and/or stop portion 17 which is arranged opposite the feed opening 12.

The fixing element 16 and the guide and/or stop portion 17 are used for the precise positioning of the powder injector 1. It can be seen from FIG. 1 that the mixing chamber 120 has a first radial recess 122 and a second radial recess 123. The powder injector 1 is inserted into the mixing chamber 120 by means of the opening 121. The first radial recess 122 has a circular cross section such that the fixing element 16 can be received in the first radial recess 122. The second radial recess 123 is configured such that said recess can receive the guide and/or stop portion 17 of the powder injector 1. The longitudinal axis of the first radial recess 122 is oriented eccentrically to the longitudinal axis of the second radial recess 123, and therefore the powder injector 1 can be inserted into the mixing chamber 120 in only one predetermined angular position, such that, at the same time, the fixing element 16 is received in the first radial recess 122 and the guide and/or stop portion 117 is received in the second radial recess 123.

It can thus be ensured that the discharge opening 13 is arranged in a precise manner along the longitudinal axis of the mixing chamber 120, whereby the powder particles can be discharged into the centre of the process gas flow. The precise positioning of the powder injector 1 can also ensure that the discharge opening 13 is opposite the centre of the nozzle, so that the powder particles are discharged into the centre of the nozzle 130. This significantly reduces the abrasion of the both the discharge opening 13 and the nozzle 130 in the inlet region thereof.

LIST OF REFERENCE NUMERALS 1 powder injector/particle feed device
10 powder injector tube
10' longitudinal axis (of the powder injector tube)
11 side wall (of the powder injector tube)
12 feed opening (of the powder injector tube)
13 discharge opening (of the powder injector tube)
13' discharge opening axis
14 end (of the powder injector tube) closed at the end face
15 backed-up volume (of the powder injector tube)
16 fixing element (of the powder injector)
17 guide and/or stop portion (of the powder injector)
100 cold-gas spray gun
110 high-pressure gas heater
111 pressure vessel
112 heating jacket
113 gas baffle plate
114 heating device
115 gas intake
116 gas outlet
120 mixing chamber
121 opening (in the mixing chamber)

122 first radial recess (in the mixing chamber)
123 second radial recess (in the mixing chamber)
130 nozzle

The invention claimed is:

1. Cold-gas spray gun comprising a mixing chamber, through which a process gas flows, and a powder injector for injecting a gas-powder mixture into the mixing chamber, the powder injector having a powder injector tube comprising a feed opening for feeding the gas-powder mixture into the powder injector and a discharge opening for discharging the gas-powder mixture from the powder injector, wherein:

the powder injector tube is closed at one end-face end, the discharge opening is perpendicular to a longitudinal axis of the powder injector tube and is formed as an opening in a side wall of the powder injector tube; and the discharge opening opens into the cavity of the powder injector tube at an axial distance from the closed end-face end of the powder injector tube such that the side walls of the powder injector tube extend past the discharge opening and the axial distance from the closed end-face generate a volume between the discharge opening and the closed end-face end of the powder injector tube.

2. Cold-gas spray gun according to claim 1, wherein the discharge opening of the powder injector tube has a discharge opening axis which encloses an angle of 90°, with a longitudinal axis of the powder injector tube.

3. Cold-gas spray gun according to claim 1, wherein:

the powder injector further comprises a fixing element which is arranged on the outside thereof, has a circular cross section and by means of which the powder injector can be fixed to the cold-gas spray gun;

the powder injector further comprises a guide and/or stop portion opposite the feed opening; and a longitudinal axis of the fixing element is oriented eccentrically to a longitudinal axis of the guide and/or stop portion.

4. Cold-gas spray gun according to claim 1, wherein the mixing chamber is arranged downstream of a high-pressure gas heater in the gas flow direction, and in that a nozzle is provided which is connected to the mixing chamber and is arranged downstream thereof in the gas flow direction.

* * * * *